US010672137B2

(12) United States Patent
Cutu

(10) Patent No.: US 10,672,137 B2
(45) Date of Patent: Jun. 2, 2020

(54) GENERATING A DISPARITY MAP HAVING REDUCED OVER-SMOOTHING

(71) Applicant: AMS SENSORS SINGAPORE PTE. LTD., Singapore (SG)

(72) Inventor: Florin Cutu, San Jose, CA (US)

(73) Assignee: ams Sensors Singapore Pte. Ltd., Singapore (SG)

( * ) Notice: Subject to any disclaimer, the term of this patent is extended or adjusted under 35 U.S.C. 154(b) by 97 days.

(21) Appl. No.: 15/752,682

(22) PCT Filed: Aug. 19, 2016

(86) PCT No.: PCT/SG2016/050401
§ 371 (c)(1),
(2) Date: Feb. 14, 2018

(87) PCT Pub. No.: WO2017/030507
PCT Pub. Date: Feb. 23, 2017

(65) Prior Publication Data
US 2018/0240247 A1 Aug. 23, 2018

Related U.S. Application Data

(60) Provisional application No. 62/206,915, filed on Aug. 19, 2015.

(51) Int. Cl.
*G06T 7/593* (2017.01)
*H04N 13/254* (2018.01)
(Continued)

(52) U.S. Cl.
CPC .............. *G06T 7/593* (2017.01); *G06T 5/002* (2013.01); *H04N 13/243* (2018.05);
(Continued)

(58) Field of Classification Search
CPC ........... G06T 2207/10012; G06T 5/002; G06T 7/593; H04N 13/243; H04N 13/254; H04N 13/257; H04N 2013/0081
See application file for complete search history.

(56) References Cited

U.S. PATENT DOCUMENTS 6,873,723 B1 3/2005 Aucsmith et al.
7,505,623 B2 3/2009 Jones et al.
(Continued)

FOREIGN PATENT DOCUMENTS

EP 2309452 4/2011
EP 2509324 10/2012

OTHER PUBLICATIONS

Dhond, U.R. et al., "Structure from Stereo—A Review," IEEE Transactions on Systems, Man, and Cybernetics, Nov./Dec. 1989, vol. 19(6):1489-1510.
(Continued)

*Primary Examiner* — Nirav G Patel
(74) *Attorney, Agent, or Firm* — Michael Best & Friedrich LLP

(57) ABSTRACT

This disclosure describes systems and techniques for generating a disparity map having reduced over-smoothing. To achieve the reduction in over-smoothing that might otherwise occur, a third image is captured in addition to stereo reference and search images. Information from the third image, which may be of the same or different type as the stereo images (e.g., RGB, grey-scale, infra-red (IR)) and which may have the same or different resolution as the stereo images, can help better define the object edges.

12 Claims, 6 Drawing Sheets

(51) Int. Cl.
*H04N 13/243* (2018.01)
*G06T 5/00* (2006.01)
*H04N 13/00* (2018.01)
*H04N 13/257* (2018.01)

(52) U.S. Cl.
CPC . *H04N 13/254* (2018.05); *G06T 2207/10012* (2013.01); *H04N 13/257* (2018.05); *H04N 2013/0081* (2013.01)

(56) References Cited

U.S. PATENT DOCUMENTS

| | | |
|---|---|---|
| 2004/0240725 A1 | 12/2004 | Xu et al. |
| 2006/0056727 A1 | 3/2006 | Jones et al. |
| 2008/0260288 A1 | 10/2008 | Redert |
| 2011/0001799 A1 | 1/2011 | Rothenberger et al. |
| 2011/0025827 A1 | 2/2011 | Shpunt et al. |
| 2012/0207388 A1 | 8/2012 | El Dokor et al. |
| 2013/0071008 A1 | 3/2013 | Chen et al. |
| 2013/0100256 A1 | 4/2013 | Kirk et al. |
| 2013/0129194 A1 | 5/2013 | Gusis et al. |
| 2013/0136299 A1 | 5/2013 | Kim et al. |
| 2013/0155050 A1 | 6/2013 | Rastogi et al. |
| 2014/0307057 A1 | 10/2014 | Kang et al. |
| 2014/0375775 A1 | 12/2014 | Yeatman, Jr. et al. |
| 2015/0138185 A1 | 5/2015 | Huang et al. |
| 2015/0170370 A1 | 6/2015 | Ukil et al. |
| 2018/0139431 A1* | 5/2018 | Simek .................. H04N 13/232 |

OTHER PUBLICATIONS

E. Olson et al., "An Introduction to Stereo Vision and Disparity Computation," 3 pages. (downloaded from Internet, May 7, 2015).
Henry, P. et al., "RGB-D mapping: Using Kinect-style depth cameras for dense 3D modeling of indoor environments," The International Journal of Robotics Research 31(5) 2012, pp. 647-663.
International Search Report of ISA/AU for PCT/SG2016/050401 (dated Oct. 28, 2016).
J/ Salvi et al., "Pattern codification strategies in structured light systems," 18 pages (downloaded from Internet, May 7, 2015).
Ohm, J. et al., "A realtime hardware system for stereoscopic videoconferencing with viewpoint adaptation," International Workshop on Synthetic-Natural Hybrid Coding and Three Dimensional Imaging (IWSNHC3DI'97), 1997.
Somanath, G. et al., "Sterio+Kinect for High Resolution Stereo Correspondences", 2013 International Conference on 3D Vision, Jun. 29-Jul. 1, 2013, pp. 9-16.
Yong, D. et al., "A Real-Time System for 3D Recovery of Dynamic Scene with multiple RGBD Imagers," IEEE Computer Society conference on Computer Vision and pattern Recognition Workshops (CVPRW), Jun. 20-25, 2011, pp. 1-8, IEEE.

* cited by examiner

GENERATING A DISPARITY MAP HAVING REDUCED OVER-SMOOTHING

CROSS-REFERENCE TO RELATED APPLICATION(S)

This application is the National Stage of International Application No. PCT/SG2016/050401, filed on Aug. 19, 2016, which claims the benefit of priority U.S. Application No. 62/206,915, filed on Aug. 19, 2015. The disclosure of the prior applications is incorporated herein by reference.

TECHNICAL FIELD

This disclosure relates to image processing and, in particular, to systems and techniques for generating a disparity map having reduced over-smoothing.

BACKGROUND

An image can be considered a projection from a three-dimensional (3D) scene onto a two-dimensional (2D) plane. Although a 2D image does not provide depth information, if two images of the same scene are available from different vantage points, the position (including the depth) of a 3D point can be found using known techniques.

For example, stereo matching is a process in which two images (a stereo image pair) of a scene taken from slightly different vantage points are matched to find disparities (differences in position) of image elements which depict the same scene element. The disparities provide information about the relative distance of the scene elements from the camera. Stereo matching enables disparities (i.e., distance data) to be computed, which allows depths of surfaces of objects of a scene to be determined. A stereo camera including, for example, two image capture devices separated from one another by a known distance, which may be referred to as the baseline distance, can be used to capture the stereo image pair.

Global-optimization methods, which are a type of stereo-matching, generate a disparity for each pixel in the reference image. Such approaches take into account global constraints (e.g., smoothness and/or image edges) and seek to minimize an energy function, which determines whether two pixels (i.e., one in the reference image, and one in the search image) are a match. A global-optimization energy function typically is comprised of two terms: a matching cost term (M) and a smoothness term (S). The matching cost term (M) is a function of the reference and search pixel intensities ($I_R$, $I_S$) and all possible pixel disparities ($D_{R-S}$), and the smoothness term (S) is a function of the intensities of adjacent pixels in the reference image ($I_R$). The matching cost term (M) typically depends on the difference in intensity between two (potentially) matching pixels in the reference and search images. The smaller the difference in the intensities between the two (potentially) matching pixels, the more likely it is that the pixels match (i.e., that they correspond to the same feature of an object in the scene whose image was captured). The smoothness term accounts for global constraints.

Generally, the intensity change should be small (i.e., smooth) for adjacent pixels unless there is, for example, an edge. The smoothness term range often is normalized to values between 0 and 1. An edge (i.e., strong differences in intensity between adjacent pixels) corresponds to a 0 (or near zero), whereas a perfectly smooth region corresponds to a 1 (or near 1). The goal is to minimize the smoothness and matching cost terms, thereby minimizing the overall energy function. In other words, it is desirable to achieve a low matching cost (indicating that the reference/search pixel pair have nearly the same intensity) and large smoothness (indicating that adjacent pixels in the reference image have nearly the same value (e.g., nearly the same intensity and/or RGB values)).

Stereo channels sometimes are implemented as low-resolution imagers (e.g., VGA resolution), which can result in edges of objects in a scene not being captured well in the images. When this happens, the smoothness term is not calculated properly. For example, large differences in intensity for adjacent pixels may not be captured, with the result that part of the image that should be assigned a smoothness value of "0" instead is assigned a value of "1". In such situations, the adjacent pixels tend to have more similar disparities (i.e., in order to minimize the energy function term) than would otherwise be the case. Thus, over-smoothing occurs, which results in a poor-quality depth map. More generally, over smoothing can result in a final disparity map in which changes in disparity between adjacent pixels is determined to be smaller than they should be at the edges (i.e., because the wrong pixels were matched).

Semi global block matching (SGBM) is a particular technique for minimizing the global energy function. SGBM can provide advantages similar to those of other global optimization techniques, and also tends to be computationally fast. Further, SGBM can be applied to any stereo matching pair (e.g., RGB, grey-scale, high-resolution, low-resolution). However, SGBM is not always effective in determining disparities for pixels associated with object edges (e.g., when the input edges are low-resolution) and can lead to over smoothing.

SUMMARY

This disclosure describes systems and techniques for image processing and, in particular, to systems and techniques for generating a disparity map having reduced over-smoothing. To achieve the reduction in over-smoothing that might otherwise occur, a third image is captured in addition to the stereo reference and search images. Information from the third image, which may be of the same or different type as the stereo images (e.g., RGB, CIE, YUV, HSL/HSV, CMYK, grey-scale, or infra-red (IR)) and which may have the same or different resolution as the stereo images, can help better define the object edges. Whereas the stereo images can be single-channel images (e.g., IR), the third image can be a multi-channel image composed of multiple pixels, each of which has multiple intensity values corresponding to different channels (e.g., RGB, CIE, YUV, HSL/HSV, CMYK).

In cases where the image types are of the same type and have the same resolution, the additional information can be obtained, for example, from the fact that the third image is acquired from a different vantage point than the stereo images. Thus, in some cases, the third image may be obtained from a vantage point that has different lighting or obviates occlusion errors. In instances where the image are of different types, one image type may be better suited for detecting images or for providing additional information than another image type. For example, in some cases, edges in a color image may be more easily detected than in a grey-scale image.

In one aspect, for example, a method of generating a disparity map includes acquiring first and second stereo images, wherein a first one of the stereo images serves as a reference image and a second one of the stereo images serves as a search image. A third image is acquired from a vantage point different from the stereo images. The method includes determining a first matching cost between respective pixels in the reference and search images, determining a smoothness term for pixels in the third image, and determining disparity values between respective pixels in the reference and search images. The disparity values minimize a sum of the first matching cost and the smoothness term, and collectively define a disparity map for each point in the reference image.

Some implementations include one or more of the following features. For example, the method can include mapping the smoothness term onto the reference image. In some cases, determining a first matching cost includes calculating a difference in intensities between the respective pixels in the reference and search images. In some instances, determining a smoothness term includes comparing intensity or color values of adjacent pixels in the third image. The method can include determining a second matching cost between respective pixels in the reference image and the third image, wherein the disparity values minimize a sum of the first matching cost, the second matching cost and the smoothness term. In some implementations, determining a second matching cost includes calculating a difference in intensities between the respective pixels in the reference image and the third image. Further, the method includes, in some instances, mapping a color space of the third image onto a color space of the reference image. The stereo images and the third image can be acquired, respectively, using different image sensors. Different depths or ranges of depth represented by the disparity map can be displayed, for example, on a display screen using different visual indicators.

The disclosure also describes an apparatus for generating a disparity map. The apparatus includes first and second image sensors to acquire first and second stereo images, respectively, wherein a first one of the stereo images serves a reference image and a second one of the stereo images serves as a search image. The apparatus also includes a third image sensor to acquire a third image from a vantage point different from the stereo images. The apparatus further includes one or more processors to generate the disparity map based on the acquired images.

The techniques described here may be suitable, in some cases, for real-time or near-real-time applications.

In some applications, the resulting disparity map can be converted to a visual disparity map of a scene that is presented on a display device. For example, the disparity map can be graphically displayed such that different distance values are indicated by different, colors, cross-hatchings or other visual indicators. In other instances, the disparity map can be advantageously used in conjunction with image recognition to provide an alert to the driver of a vehicle, or to decelerate the vehicle so as to avoid a collision.

Other aspects, features and advantages will be readily apparent from the following detailed description, the accompanying drawings, and the claims.

DETAILED DESCRIPTION

Figure 1:
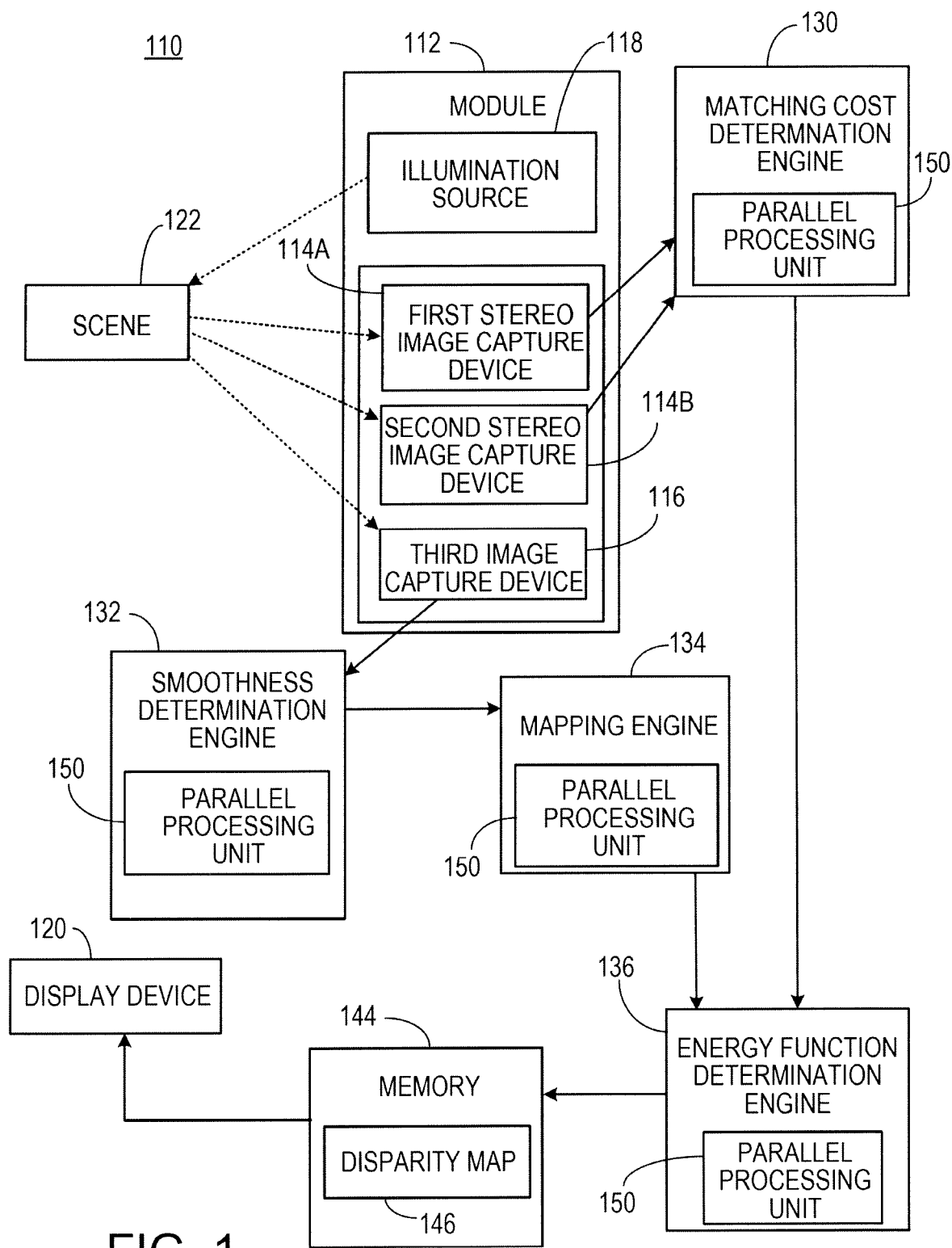
FIG. 1 is a block diagram showing an example of an apparatus for presenting a disparity map.

As shown in FIG. 1, an apparatus 110 includes an optoelectronic module 112 that includes two (or more) depth channels, each of which has a respective image capture device (e.g., camera) 114A, 114B, and a third channel, which has another image capture device (e.g., camera) 116. The apparatus 110 is arranged to generate a disparity map based on images of a scene 122 captured by the cameras 114A, 114B, 116, and to display the disparity map, for example, on the display device (e.g., a LCD (liquid crystal display) monitor) 120 of a computing device (e.g., a smart phone or other handheld portable device). Different depths (or ranges of depth) represented by the disparity map can be displayed on the screen of the computing device, for example, as different colors or using other visual indicators.

In general, the depth cameras 114A, 114B are arranged to capture stereo image data of the scene 122, and the third camera 116 is arranged to capture an image of the scene 122 from another vantage point, which in some cases may have different lighting or may obviate occlusion errors. The third image may be of the same or different type (e.g., RGB, grey-scale, infra-red (IR)) as the stereo imagers and may have the same or different resolution as the stereo images, depending on the implementation. The cameras 114A, 114B, 116 can be implemented, for example, as CMOS or CCD image sensors.

In the illustrated example of FIG. 1, whereas the depth cameras 114A, 114B may have relatively low-resolution (e.g., VGA resolution or quarter VGA or even QQVGA resolution), the camera 116 for the third channel preferably is a higher-resolution camera that can acquire higher quality images.

In some cases, the module 112 also may include an associated illumination source 118 arranged to project a pattern of illumination onto the scene 122. When present, the illumination source 118 can include, for example, an infrared (IR) projector operable to project a pattern (e.g., of dots or lines) onto objects in the scene 122. The illumination source 118 can be implemented, for example, as a light emitting diode (LED), an infra-red (IR) LED, an organic LED (OLED), an infra-red (IR) laser or a vertical cavity surface emitting laser (VCSEL). The projected pattern of optical features can be used to provide texture to the scene to facilitate stereo matching processes between the stereo images acquired by the devices 114A, 114B.

The apparatus 110 further includes various engines to process images acquired by the cameras 114A, 114B, 116. In particular, the apparatus 110 includes a matching cost determination engine 130, a smoothness determination engine 132, a mapping engine 134, and an energy function determination engine 136. Details regarding the functionality and algorithms implemented by these engines are described below.

The apparatus 110 also includes memory 144, which can store the images acquired by the cameras 114A, 114B, 116, as well as various data processed or output by the engines 130-136. For example, as illustrated in FIG. 1, the memory 144 can store a disparity map 146 generated by the energy function determination engine 136.

Each of the foregoing engines 130, 132, 134, 136 can be implemented, for example, using a computer and can include a respective parallel processing unit 150 (e.g., an application specific integrated circuit (ASIC) or a field programmable gate array (FPGA)). In some instances, the engines 130, 132, 134, 136 can be implemented in software (e.g., in a processor of the mobile device (e.g., smartphone)). Although the various engines 130-136 and memory 144 are shown in FIG. 1 as being separate from the module 112, in some implementations they may be integrated as part of the module 112. For example, the engines 130-136 and memory 144 may be implemented as one or more integrated circuit chips mounted on a printed circuit board (PCB) within the module 112, along with the image capture devices 114A, 114B, 116. In some cases, the illumination source 118 (if present) may be separate from the module 112 that houses the image capture devices 114A, 114B, 116. Further, the module 112 also can include other processing and control circuitry. Such circuitry also can be implemented, for example, in one or more integrated circuit chips mounted on the same PCB as the image capture devices.

Figure 2:
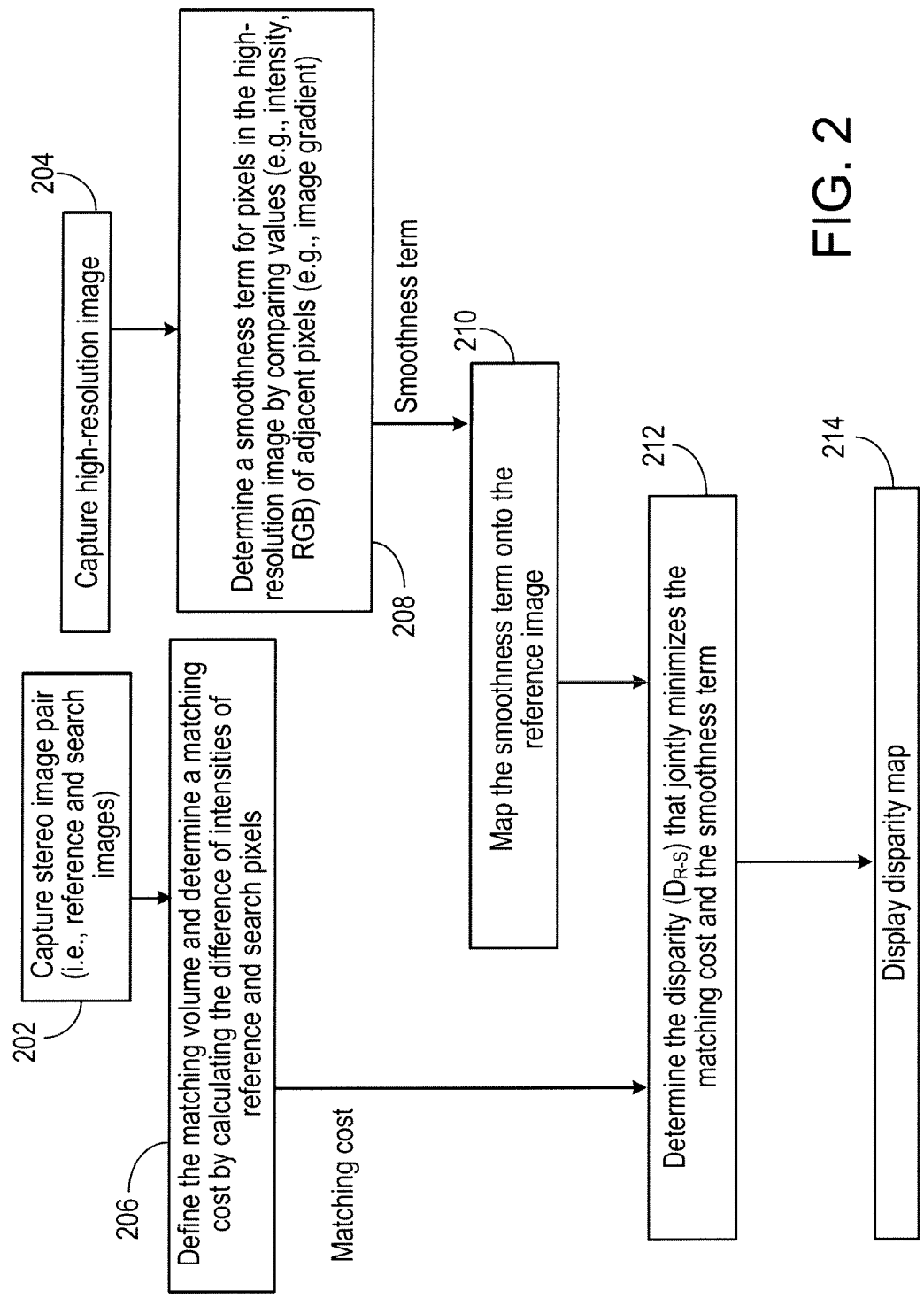
FIG. 2 is a flow chart of a first implementation of a method for presenting a disparity map.

Referring now to FIG. 2, it is assumed in this example that the third camera 116 is of the same type (e.g., RGB, grey-scale, infra-red (IR)) as the depth cameras 114A, 114B. In this case, the depth cameras 114A, 114B acquire a stereo image pair (202). A first one of the acquired images serves as reference image, whereas a second one of the acquired images serves as a search image. The third (high-resolution) camera 116 is used to acquire a high-resolution image (204). As described below, instead of using only the stereo image pair to determine the matching cost and smoothness terms for the energy function, the third (high-resolution) image is used to obtain the smoothness term for the energy function. Using a higher resolution image can improve detection of edges (i.e., strong differences in intensity between adjacent pixels) in the scene 122 and can lead to a more accurate smoothness term.

The stereo images acquired by the depth cameras 114A, 114B are provided to the matching cost determination engine 130. As indicated by 206 in FIG. 2, the matching cost determination engine 130 uses the stereo images to define a matching volume, which serves as input for the matching cost term of the energy function. In particular, for each pixel (i.e., pixel 1 through pixel N) in the reference image, the matching cost determination engine 130 considers all possible disparity values from 0 to a predetermined maximum (Max D) and computes the associated matching cost with respect to pixels in the search image. Examples of pixel-based matching cost techniques include the following: absolute differences, squared differences, sampling-insensitive absolute differences, or truncated versions, both on grey and color images. Other techniques can be used in some implementations. Thus, for example, the matching cost determination engine 130 can determine the matching cost by taking the difference of intensities of reference and search pixels. The closer the intensities of the compared pixels, the more likely they are a correct match (i.e., the lower the matching cost).

The high-resolution image acquired by the camera 116 is provided to the smoothness determination engine 132. As indicated by 208 in FIG. 2, the smoothness determination engine 132 uses the high-resolution image to calculate a smoothness term by comparing values (e.g., intensity or color such as RGB values) of adjacent pixels. The resulting comparisons establish an image gradient, which indicates how similar adjacent pixels are to one another. For example, if the values of adjacent pixels are similar, the smoothness is high, whereas if the value of adjacent pixels are dissimilar, the smoothness is low. Thus, similar color (or intensity) value, for example, means large smoothness. As mentioned above, using the high-resolution image for determining the smoothness term can be advantageous because edges can, in some cases, be more easily detected and identified in the high-resolution image than in (low-resolution) depth images.

Next, the smoothness term generated by the smoothness determination engine 132 is provided to the mapping engine 134, which maps the smoothness term onto the reference image acquired by depth cameras 114A, 114B (see 210 in FIG. 2). Such mapping, which can depend on factors such as focal length(s) of the optical system, base line distance between the depth cameras 114A, 114B, and calibration data for all three cameras 114A, 114B, 116, is needed because the high-resolution image is captured from a different vantage point from the depth images. The smoothness term also is a function of the disparity values ($D_{R\text{-}S}$) between the reference and search depth images.

The matching cost term and the mapped smoothness term are provided to the energy function calculation engine 136. The baseline distance, focal length, and/or other parameters are known by the system (e.g., stored in memory of software) for all three cameras 114A. 114B, 116. When a pair of pixels are successfully matched in the reference and search images, the corresponding pixel in the third image can be identified. The smoothness term considers intensities of adjacent pixels in the reference image; since the third image is high-resolution, RGB, there is a better likelihood that edges are properly identified. Further, since the disparity is known to the system based on the reference and search images, and the third imager focal length as well as the baseline value to the third imager is known to the system, then the smoothness can be related back from the third image pixel to the reference and/or search image pixels. Further details are described below.

The energy function calculation engine 136 determines the disparity values ($D_{R\text{-}S}$) that jointly minimize the matching cost and smoothness terms (see 212 in FIG. 2). Thus, the energy function calculation engine 136 seeks the disparity values that minimize the energy function:

$$E = M(D_{R\text{-}S}, I_R, I_S) + S(D_{R\text{-}S}, I_{3rd}),$$

where the matching term (M) is a function of the disparity values ($D_{R\text{-}S}$) between the reference and search depth images, as well as the intensity values ($I_R$, $I_S$) of the reference and search depth images, and where the smoothness term (S) is a function of the disparity values ($D_{R\text{-}S}$) between reference and search depth images, as well as the intensity values ($I_{3rd}$) of the high-resolution image. The resulting disparity values for the respective pixels define an improved disparity map that can be displayed, for example, on the display screen of the display device 120 (see 214 in FIG. 2). The foregoing technique can help reduce the extent of over-smoothing that occurs.

Figure 3:
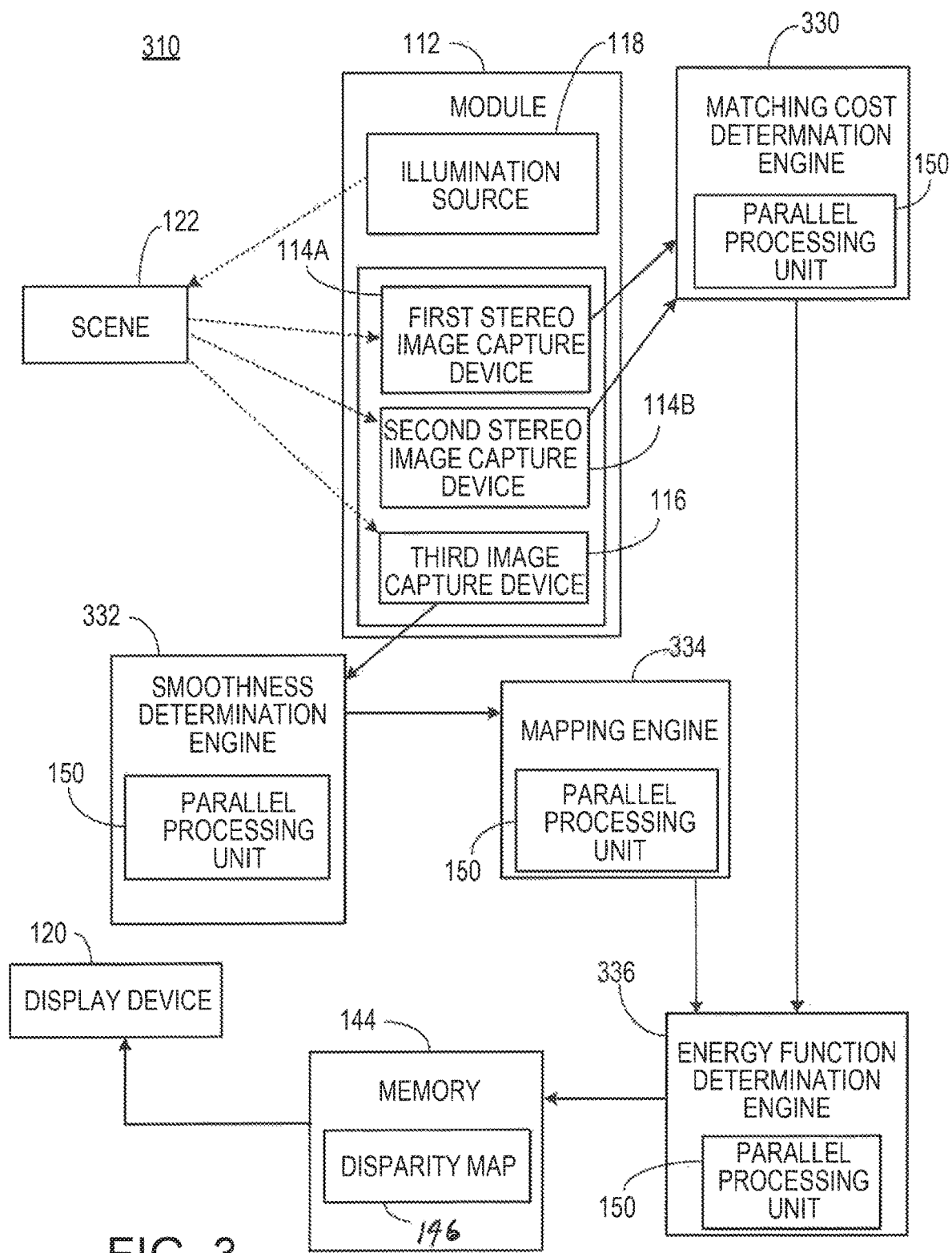
FIG. 3 is a block diagram showing another example of an apparatus for presenting a disparity map.
Figure 4:
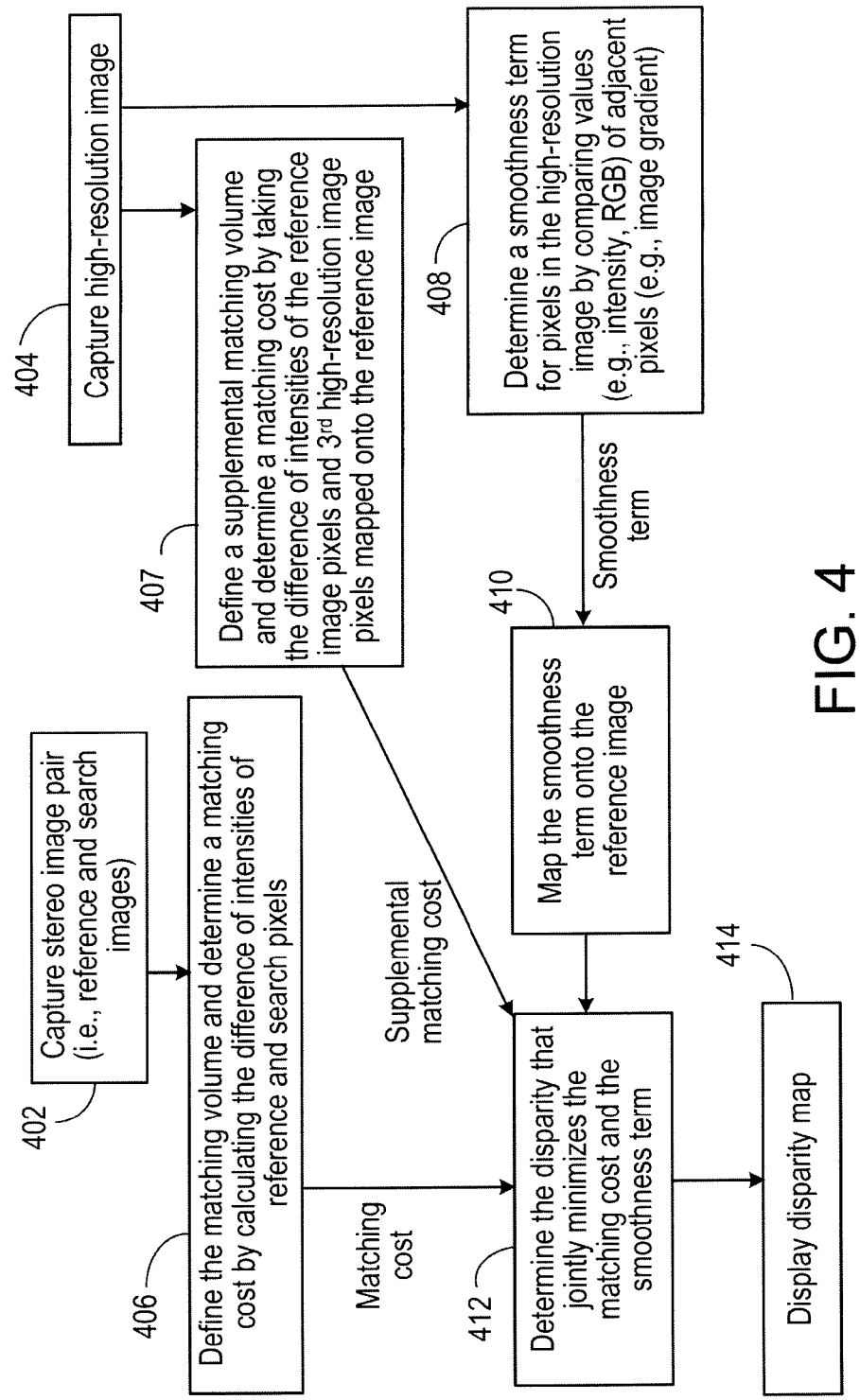
FIG. 4 is a flow chart of a second implementation of a method for presenting a disparity map.

FIGS. 3 and 4 illustrate another example in which the third camera 116 is of the same type (e.g., RGB, grey-scale, or infra-red (IR)) as the depth cameras 114A, 114B. This example is similar in some respects to the example of FIGS. 1 and 2, but includes determining a supplemental matching cost that also is used to calculate the energy function. The apparatus 310 of FIG. 3 can be similar to the apparatus 110 of FIG. 1, but with the following modifications. First, in addition to the stereo images from the depth cameras 114A, 114B, the image captured by the third image capture device 116 also is provided to the matching cost determination engine 330, which can be used to calculate both a matching cost (based on the stereo images) and a supplemental matching cost (based, in part, on the third high-resolution image). Second, the matching cost determination engine 330 can interact with the mapping engine 334 to allow information from the third (high-resolution) image to be mapped onto the reference image. Further details of the apparatus 310 are described in greater detail in connection with FIG. 4.

As indicated by FIG. 4, the depth cameras 114A, 114B acquire a stereo image pair (402). A first one of the acquired images serves as a reference image, whereas a second one of the acquired images serves as a search image. The third (high-resolution) camera 116 is used to acquire a high-resolution image (404). The stereo images acquired by the depth cameras 114A, 114B are provided to the matching cost determination engine 230. As indicated by 406 in FIG. 4, the matching cost determination engine 330 uses the stereo images to define a first matching volume, which serves as input for the matching cost term of the energy function. In particular, for each pixel (i.e., pixel 1 through pixel N) in the reference image, the matching cost determination engine 230 considers all possible disparity values from 0 to a predetermined maximum (Max D) and computes the associated matching cost with respect to pixels in the search image. Thus, for example, the matching cost determination engine 330 can determine the matching cost by taking the difference of intensities of reference and search pixels. The closer the intensities of the compared pixels, the more likely they are a correct match (i.e., the lower the matching cost). The matching cost determination engine 330 then provides the first matching cost ($M_1$) to the energy function determination engine 336.

The high-resolution image acquired by the camera 116 also is provided to the matching cost determination engine 330, which defines a second, or supplemental, matching volume that serves as another input for the matching cost term of the energy function. In particular, for each pixel (i.e., pixel 1 through pixel N) in the reference image, the matching cost determination engine 330 considers all possible disparity values from 0 to a predetermined maximum (Max D) and computes the associated matching cost with respect to pixels in the high-resolution image (407 in FIG. 4). The matching cost determination engine 330 can determine the matching cost, for example, by taking the difference of intensities of the reference image pixels and the high-resolution image pixels. The closer the intensities of the compared pixels, the more likely they are a correct match (i.e., the lower the matching cost). As part of the foregoing process, the matching cost determination engine 330 interacts with the mapping engine 334 so that information from the third (high-resolution) image can be mapped onto the reference image. Such mapping depends on the disparity ($D_{R-S}$), as well as the focal lengths of the optical systems, the base line distance between the depth cameras 114A, 114B, the baseline distance between either of the depth cameras 114A/114B and the 3$^{rd}$ camera 116, and calibration data for all three cameras 114A, 114B, and 116, since the high-resolution image is captured from a vantage point different from the depth images. The matching cost determination engine 330 then provides the supplemental matching cost ($M_2$) to the energy function determination engine 336.

The high-resolution image acquired by the camera 116 also is provided to the smoothness determination engine 332. The smoothness determination engine 332 uses the high-resolution image to calculate a smoothness term by comparing values (e.g., intensity or color such as RGB values) of adjacent pixels (408). The resulting comparisons establishes an image gradient, which indicates how similar adjacent pixels are to one another. For example, if the values of adjacent pixels are similar, the smoothness is high, whereas if the value of adjacent pixels are dissimilar, the smoothness is low. Thus, similar color (or intensity) value, for example, means large smoothness. As mentioned above, using the high-resolution image for determining the smoothness term can be advantageous because edges are more easily detected and identified in the high-resolution image than in (low-resolution) depth images.

Next, the smoothness term generated by the smoothness determination engine 332 is provided to the mapping engine 334, which maps the smoothness term onto the reference image acquired by depth cameras 114A or 114B (see 410 in FIG. 4). As explained previously, such mapping is needed because the high-resolution image is captured from a vantage point different from the depth images. The smoothness term itself is a function of the disparity values ($D_{R-S}$) between the reference and search depth images, as well as the focal lengths of the optical systems, the base line distance between the depth cameras 114A, 114B, the baseline distance between either of the depth cameras 114A/114B and the third camera 116, and calibration data for all three cameras 114A, 114B, and 116.

The matching cost terms ($M_1$ and $M_2$) and the mapped smoothness term (S) are provided to the energy function calculation engine 336, which determines the disparity values ($D_{R-S}$) that jointly minimize the matching cost and smoothness terms (see 412 in FIG. 4). Thus, the energy function calculation engine 336 seek the disparity values to minimize the energy function:

$$E=M_1(D_{R-S},I_R,I_S)+M_2(D_{R-S},I_R,I_{3rd})+S(D_{R-S},I_{3rd})$$

where the first matching term ($M_1$) is a function of the disparity values ($D_{R-S}$) between the reference and search depth images, as well as the intensity values ($I_R$, $I_S$) of the reference and search images, where the second (supplemental) matching term ($M_2$) is a function of the disparity values ($D_{R-S}$) between the reference image and the search image, as well as the intensity values ($I_R$, $I_{3rd}$) of the reference and high-resolution image, and where the smoothness term (S) is a function of the disparity values ($D_{R-S}$) between the reference image and the search image, as well as the intensity values ($I_{3rd}$) of the high-resolution image.

The resulting disparity values for the respective pixels define a disparity map that can be displayed, for example, on the display screen of the display device 120 (414). The foregoing technique can help reduce the extent of over-smoothing that appears in the disparity map.

As indicated above, in the foregoing examples of FIGS. 1-4, it was assumed that the third camera 116 is of the same type (e.g., RGB, grey-scale, infra-red (IR)) as the depth cameras 114A, 114B. In the following example of FIG. 5, it is assumed that the third camera 116 is of a different type (e.g., RGB, grey-scale, infra-red (IR)) from the depth cameras 114A, 114B. For example, in some implementations, whereas the depth cameras 114A, 114B are IR-based sensors, the third camera 116 is a color-based (e.g., RGB) sensor. In such cases, the color space of the third (color) image needs to be mapped to the color space of the reference image. Color space mapping, or conversion, involves translating the representation of a color from one basis (e.g., RGB) to another (e.g., IR).

Although some of the foregoing examples are described for situations in which the depth cameras 114A, 114B have lower resolution than the third camera 116, the techniques also can be used even if the resolution of the depth cameras and the third camera are substantially the same. More generally, the foregoing implementations provide techniques that can be used regardless of whether the depth cameras 114A, 114B are of the same type as the third camera 116, or a different type. Further, the foregoing implementations provide techniques that can be used regardless of whether the depth cameras 114A, 114B have a resolution different from the third camera 116, or substantially the same resolution. Thus, in some instances, the stereo images are of the same type as the third image, and have substantially the same resolution. In other instances, the stereo images are of the same image type as the third image, but the third image has different (e.g., higher) resolution. In yet other instances, the stereo images are of an image type that differs from the third image, but the various images have substantially the same resolution. In other instances, the stereo images are of an image type that differs from the third image, and the third image has a different (e.g., higher) resolution.

In cases where the image types are of the same and also have the same resolution, using the third image in conjunction with the stereo images can be advantageous because the third image is taken from a vantage point that differs from that of the stereo images. For example, the location of the third image capture device 116 may allow the module to acquire an image that uses different lighting or obviates some occlusion errors. In cases, where the image types are different, one of the image types may be better suited for detecting images or for providing additional information relative to the other image type. For example, edges in a color image may be detected more easily than in a grey-scale image. Since differences in color sometimes correlate to differences in distance (i.e., object edges), they can be used advantageously.

Figure 5:
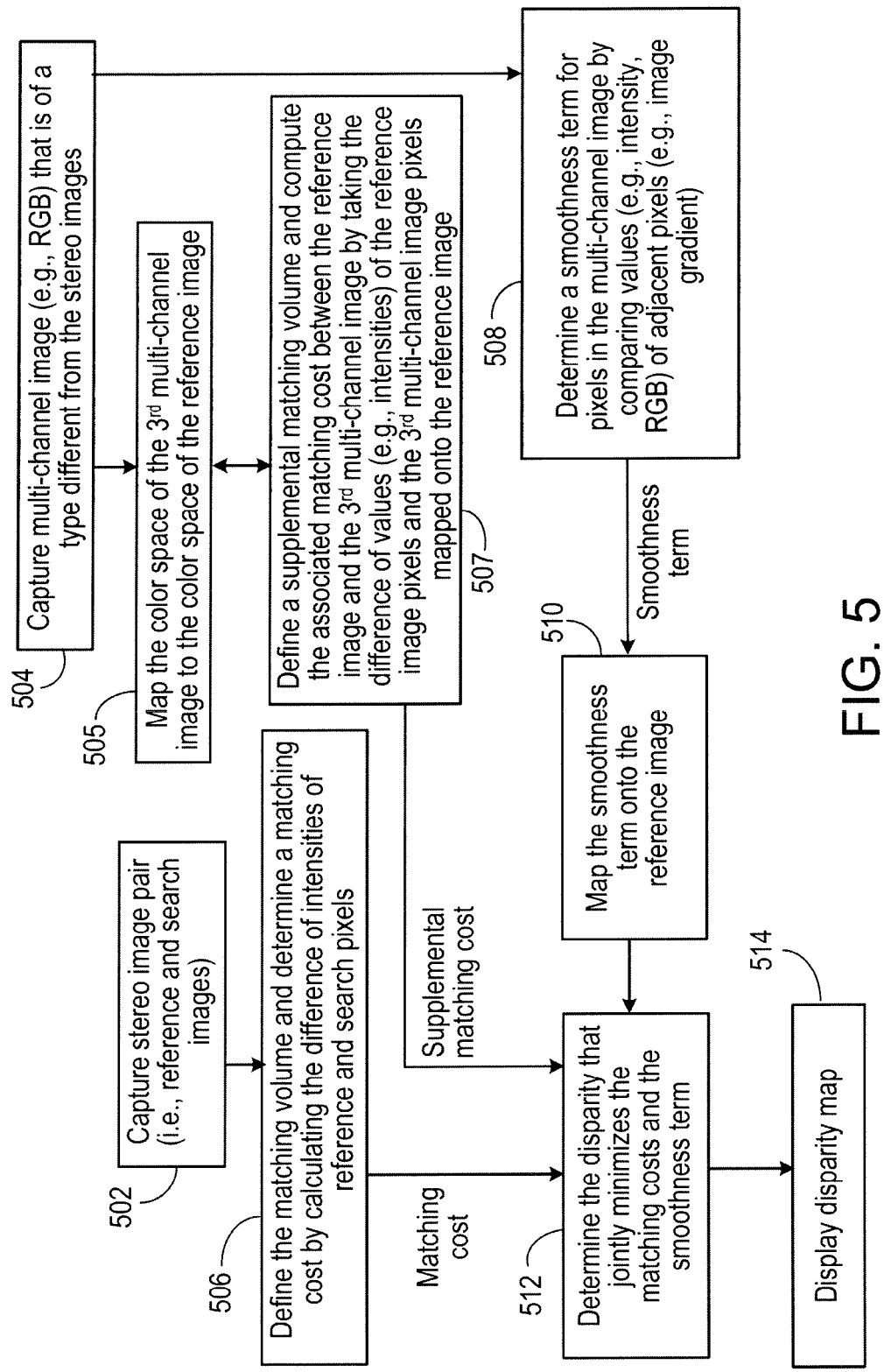
FIG. 5 is a flow chart of a third implementation of a method for presenting a disparity map.

FIG. 5 illustrates an example in which the third image is multi-channel image (e.g., RGB). The process illustrated by FIG. 5 is similar to that of FIG. 4, but includes an additional step (505) of mapping the color space of the image acquired by the third image capture device 116 to the color space of the reference image acquired by one of the depth cameras 114A, 114B. The other steps in FIG. 5 (i.e., 502, 504, 506, 507, 508, 510, 512, 514) are substantially the same as the counterpart steps in FIG. 4. Here too, the foregoing process can help reduce the extent of over-smoothing that appears in the disparity map.

Figure 6:
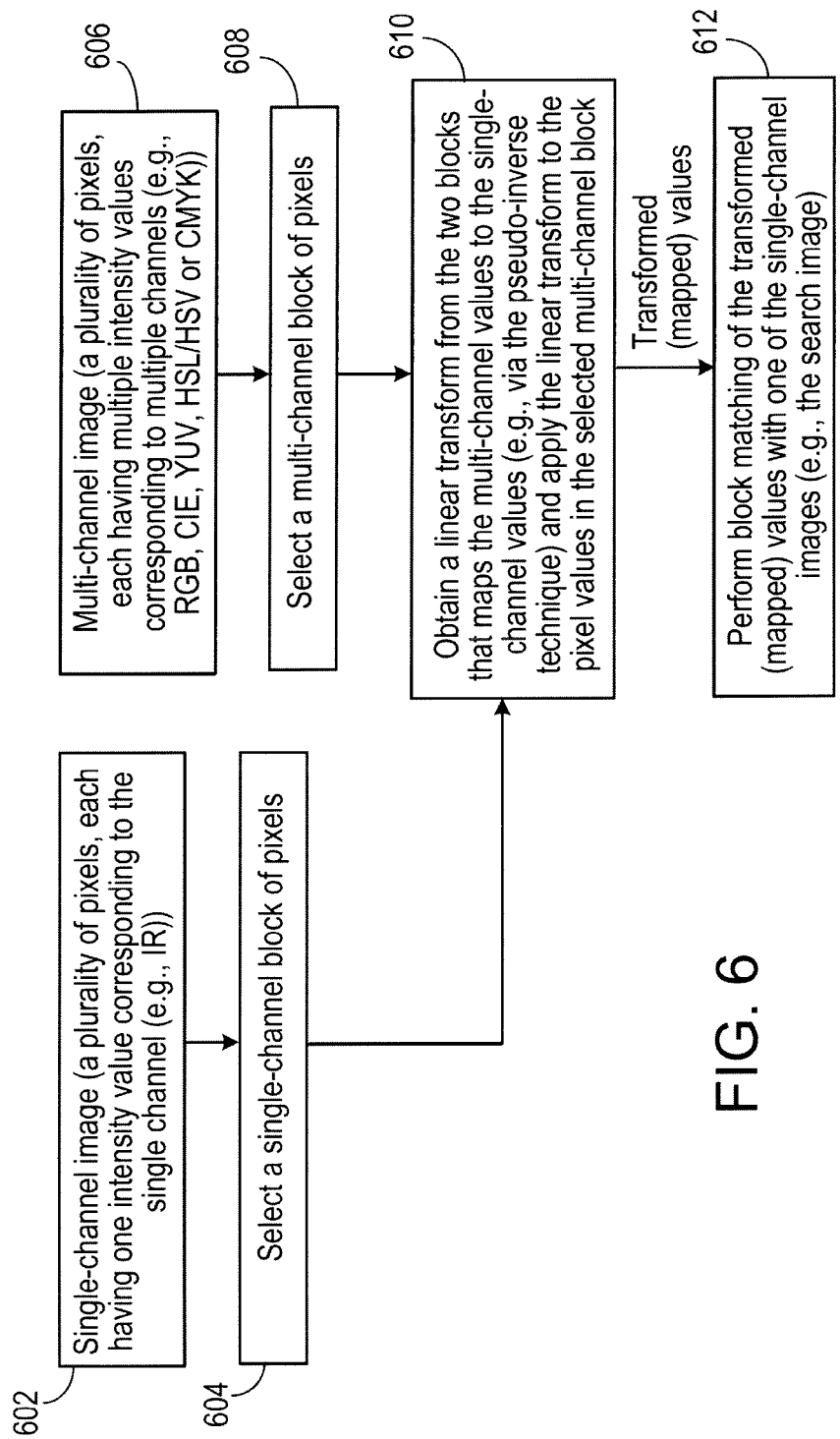
FIG. 6 is a flow chart illustrating an example of color space mapping.

Further details of the color space mapping (505) according to some implementations is illustrated by the process of FIG. 6. As indicated at 602, the process receives as input a single-channel image (i.e., the reference image from the first or second image capture devices 114A, 114B that has multiple pixels, each of which has a single intensity value corresponding to the single channel). The process then selects a block of pixels of a specified size (e.g., 15×15 pixels) from the single-channel image (604). As indicated by 606, the process also receives as input a multi-channel image (i.e., an image from the third image device 116 composed of multiple pixels, each of which has multiple intensity values corresponding to different channels). In the event that the multi-channel image is a high-resolution image, the process may include down-sampling of the high-resolution image. The process then selects a block of pixels of the specified size from the multi-channel image (608). The selected block of pixels for the multi-channel image should be along the epi-polar line of the block selected from the single-channel image.

To calculate the matching cost (i.e., a quantity that describes how close the multi-channel (e.g., RGB) search block is to the original single-channel (e.g., IR) reference block), the process transforms the values within the multi-channel block into corresponding single-channel values. This can be accomplished for each block by performing a linear transform (FIG. 6 at 610), which depends on the values from both the single-channel reference block and each new search multi-channel block. A pseudo-inverse technique can be used for the linear transform. Thus, at each block location in the search image, two processes take place in parallel: 1) the linear transform uses the data of the two blocks (i.e., the original reference block and the current search block) to convert multi-channel; (e.g., RGB) values to single-channel (e.g., IR) values; and 2) a score is tabulated that corresponds to the likelihood of that search block being a match. This score is the supplemental matching cost.

The foregoing process, including steps 608 and 610, is repeated for each block in the multi-channel search image along the epi-polar line of the block selected from the single-channel image. For example, the search block can be shifted by one column or one row at a time, and the process is repeated along the epi-polar line so as to identify a match between the reference block and search block (612). The process, however, is ongoing and iterative. Thus, the process does not determine a final match until all of the matching costs (i.e., between IR, IR images) and smoothness terms are optimized. At that point the process determines which pixels (or blocks of pixels) in the stereo images (e.g., IR, IR) and the multi-channel third image (e.g., RGB) correspond.

The foregoing process not only considers value (e.g., intensity) differences from block to block in a reference-search image pair, but also considers value (e.g., intensity) differences from block to block in a reference, and supplemental-search image pair, and further includes a smoothness term. All the foregoing factors should be simultaneously optimized to establish correct disparity between the IR, IR reference, search image pair. Thus, the disparity value is determined so as to optimize (e.g., minimize) the matching cost, the supplemental matching cost and the smoothness term.

A simplified example of the linear transform associated with each new search block is as follows:
Blocks are of size N×N pixels.
The reference block (e.g., from an IR image) is represented as a vector x, of dimensionality $N^2$.
The search block (e.g, from an RGB image) is represented as a matrix y, of dimensionality ($N^2 \times 3$). The search block is located, in the RGB image, along a line that corresponds to the center of the reference block in the IR image (i.e., the epi-polar line).
Derive the (1×3) linear transformation M that best maps y into x in the least-squares error sense, as follows:
M must satisfy: y*M=x.
Therefore, M is given by: M=pinv(y)*x.
Apply M to y, thus obtaining the predicted value of x, x eval:
x_eval=y*M.
x_eval is compared to x, to determine how well y (the search block) fits x (the reference block).
matching_error=norm(x_eval−x), where norm( ) is the Euclidean norm. matching_error measures how well y (the search block) fits x (the reference block). For a perfect match, the matching error=0.
The matching_error (which is a cost function) is used to determine the block in the RGB image that best matches the reference block in the IR image (in combination with the other matching errors and smoothness terms).

The techniques described here can be particularly advantageous, for example, in hand-held mobile devices and other applications where the depth channels often use low-resolution image sensors and where the image and optics for the depth channels tends to be of relatively poorer quality. Of course, the techniques can be used for other applications as well.

The techniques described here may be suitable, in some cases, for real-time applications in which the output of a computer process (i.e., rendering) is presented to the user such that the user observes no appreciable delays that are due to computer processing limitations. For example, the techniques may be suitable for real-time applications on the order of about at least 30 frames per second or near real-time applications on the order of about at least 5 frames per second.

In some implementations, the disparity map can be used as input for distance determination. For example, in the context of the automotive industry, the disparity map can be used in conjunction with image recognition techniques that identify and/or distinguish between different types of objects (e.g., a person, animal, or other object) appearing in the path of the vehicle. The nature of the object (as determined by the image recognition) and its distance from the vehicle (as indicated by the disparity map) may be used by the vehicle's operating system to generate an audible or visual alert to the driver, for example, of an object, animal or pedestrian in the path of the vehicle. In some cases, the vehicle's operating system can decelerate the vehicle automatically to avoid a collision.

Various implementations described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be readily apparent, various modifications can be made to the foregoing examples within the spirit of the invention. For example, in some instances, some processes or steps may be omitted. Further, in some cases, additional processes or steps may be performed. Other modifications may be made as well. Thus, other implementations are within the scope of the claims.

What is claimed is:

1. A method of generating a disparity map comprising:
   acquiring first and second stereo images, wherein a first one of the stereo images serves as a reference image and a second one of the stereo images serves as a search image;
   acquiring a third image from a vantage point different from the stereo images;
   determining a first matching cost between respective pixels in the reference and search images;
   determining a smoothness term for pixels in the third image;
   determining disparity values between respective pixels in the reference and search images,
   wherein the disparity values minimize a sum of the first matching cost and the smoothness term, and
   wherein the disparity values collectively define a disparity map for each point in the reference image; and
   mapping the smoothness term onto the reference image.

2. The method of claim 1 wherein the stereo images and the third image are of the same type, and wherein the type is infra-red, color, or grey-scale.

3. The method claim 1 wherein the third image has a higher resolution than the stereo images.

4. The method claim 1 wherein determining a first matching cost includes calculating a difference in intensities between the respective pixels in the reference and search images.

5. The method of claim 1 wherein determining a smoothness term includes comparing intensity or color values of adjacent pixels in the third image.

6. The method of claim 1 further including: determining a second matching cost between respective pixels in the reference image and the third image, wherein the disparity values minimize a sum of the first matching cost, the second matching cost and the smoothness term.

7. The method of claim 6 wherein determining a second matching cost includes calculating a difference in intensities between the respective pixels in the reference image and the third image.

8. The method of claim 6 wherein the stereo images and the third image are of the same type, and wherein the type is infra-red, color, or grey-scale.

9. The method of claim 6 wherein the third image has a higher resolution than the stereo images.

10. The method of claim 1 wherein a type of the stereo images and a type of the third image are different, wherein the types are infra-red, color, or grey-scale, and wherein the method further comprises: mapping a color space of the third image onto a color space of the reference image.

11. The method of claim 10 wherein the third image has a higher resolution than the stereo images.

12. The method claim 1 wherein the stereo images and the third image are acquired, respectively, using different image sensors, and wherein different depths or ranges of depth represented by the disparity map are displayed on a display screen using different visual indicators.

* * * * *